(12) United States Patent
Sakai

(10) Patent No.: US 10,175,920 B2
(45) Date of Patent: Jan. 8, 2019

(54) INFORMATION PROCESSING APPARATUS, INFORMATION PROCESSING SYSTEM, INFORMATION PROCESSING METHOD, AND NON-TRANSITORY COMPUTER READABLE MEDIUM

(71) Applicant: FUJI XEROX CO., LTD., Tokyo (JP)

(72) Inventor: Yutaka Sakai, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/449,202

(22) Filed: Mar. 3, 2017

(65) Prior Publication Data

US 2018/0081605 A1  Mar. 22, 2018

(30) Foreign Application Priority Data

Sep. 16, 2016  (JP) ................................ 2016-181469

(51) Int. Cl.
*G06F 15/00* (2006.01)
*G06F 3/12* (2006.01)
(Continued)

(52) U.S. Cl.
CPC .......... *G06F 3/1238* (2013.01); *G06F 3/1222* (2013.01); *G06F 3/1288* (2013.01);
(Continued)

(58) Field of Classification Search
CPC .... G06F 3/1238; G06F 3/1222; G06F 3/1288; G06F 21/608; H04L 63/06; H04L 63/083; H04N 1/00411; H04N 1/4413
(Continued)

(56) References Cited

U.S. PATENT DOCUMENTS

2012/0303830 A1* 11/2012 Tobioka .................. G06F 21/31
                                                                 709/229
2017/0180346 A1*  6/2017 Suarez ................ G06F 9/45558

FOREIGN PATENT DOCUMENTS

JP      2006-260002 A    9/2006
JP      2011-059896 A    3/2011

OTHER PUBLICATIONS

Machine translation of Japanese Patent Document No. 2006-26002, Tobioka, Sep. 28, 2006. (Year: 2006).*

* cited by examiner

*Primary Examiner* — Mark R Milia
(74) *Attorney, Agent, or Firm* — Oliff PLC

(57) ABSTRACT

An information processing apparatus includes: a memory that stores authentication information on a user that utilizes a service provided by a service device in correlation with each application for utilizing the service; a unit that executes the application in response to an instruction from the user; a unit that requests user authentication by acquiring the user authentication information correlated with the executed application from the memory and transmitting the acquired authentication information to the service device; a unit that acquires an authentication result transmitted in response to the authentication information; and a unit that re-requests user authentication, when the authentication result indicates a failure in authentication, by an authentication method different from that used in a case of the failure in authentication, by acquiring user authentication information correlated with an application different from the executed application from the memory and transmitting the acquired authentication information to the service device.

11 Claims, 6 Drawing Sheets

(51) Int. Cl.
*G06F 21/60* (2013.01)
*H04L 29/06* (2006.01)
*H04N 1/00* (2006.01)
*H04N 1/44* (2006.01)
*G06F 21/31* (2013.01)
*G06F 21/62* (2013.01)

(52) U.S. Cl.
CPC ............ *G06F 21/31* (2013.01); *G06F 21/608* (2013.01); *G06F 21/6218* (2013.01); *H04L 63/06* (2013.01); *H04L 63/08* (2013.01); *H04L 63/083* (2013.01); *H04N 1/00411* (2013.01); *H04N 1/4413* (2013.01); *G06F 2221/2149* (2013.01); *H04N 2201/0094* (2013.01)

(58) Field of Classification Search
USPC ........................................................ 358/1.14
See application file for complete search history.

| AUTHENTICATION INFORMATION ||
|---|---|
| ACCESS TOKEN | USER NAME AND PASSWORD |
| ACCESS TOKEN A1 ISSUED FOR USER A | USER NAME AND PASSWORD OF USER A |
| ACCESS TOKEN B1 ISSUED FOR USER B | USER NAME AND PASSWORD OF USER B |
| ACCESS TOKEN C1 ISSUED FOR USER C | USER NAME AND PASSWORD OF USER C |

| USER ID | AUTHENTICATION INFORMATION | |
|---|---|---|
| | DOCUMENT MANAGEMENT APP | TRANSLATION APP |
| userA | ACCESS TOKEN A1 ISSUED FOR USER A | USER NAME AND PASSWORD OF USER A |
| userB | ACCESS TOKEN B1 ISSUED FOR USER B | USER NAME AND PASSWORD OF USER B |
| userC | ACCESS TOKEN C1 ISSUED FOR USER C | USER NAME AND PASSWORD OF USER C |

TB2

INFORMATION PROCESSING APPARATUS, INFORMATION PROCESSING SYSTEM, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-181469 filed Sep. 16, 2016.

BACKGROUND

Technical Field

The present invention relates to an information processing apparatus, an information processing system, an information processing method, and a non-transitory computer readable medium.

SUMMARY

According to an aspect of the present invention, there is provided an information processing apparatus including: a memory that stores authentication information on a user that utilizes a service provided by a service device in correlation with each application for utilizing the service; an execution unit that executes the application in response to an instruction from the user; a requesting unit that requests authentication for the user by acquiring the authentication information on the user correlated with the executed application from the memory and transmitting the acquired authentication information to the service device; an acquisition unit that acquires an authentication result transmitted in response to the authentication information; and a re-requesting unit that re-requests authentication for the user, in a case where the authentication result indicates a failure in authentication, by an authentication method that is different from an authentication method used in a case of the failure in authentication, by acquiring authentication information on the user correlated with an application that is different from the application executed by the execution unit from the memory and transmitting the acquired authentication information to the service device.

BRIEF DESCRIPTION OF THE DRAWINGS

An exemplary embodiment of the present invention will be described in detail based on the following figures, wherein.

DETAILED DESCRIPTION

[Exemplary Embodiment]
(Overall Configuration)

Figure 1:
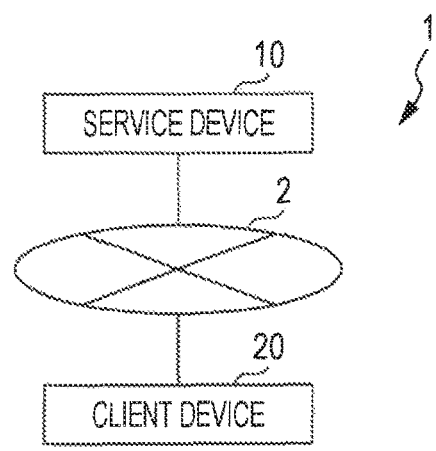
FIG. 1 illustrates an information processing system according to an exemplary embodiment of the present invention.

FIG. 1 illustrates the overall configuration of an information processing system 1 according to an exemplary embodiment of the present invention. The information processing system 1 is a system that provides a service related to a document, for example, to a user of a client device 20.

A communication line 2 is a communication network over which data communication is performed. Plural computer devices are connected to the communication line 2 to perform data communication. The communication line 2 includes wired and wireless communication networks. In the exemplary embodiment, a service device 10 and the client device 20 are connected to the communication line 2.

The service device 10 is a device that provides a service related to a document to the user of the client device 20. For example, the service device 10 provides the user with a document management service for document data that represent a document for managing, such as saving, distributing, and deleting, a document. The service device 10 also provides the user with a translation service for translating a document represented by document data. The services provided by the service device 10 are not limited to the services discussed above, and may be other services.

In the exemplary embodiment, when the user utilizes the service provided by the service device 10, is necessary that the user should be authenticated by the service device 10. The service device 10 stores authentication information for authenticating users that are permitted to utilize the services provided by the service device 10, and authenticates the user using authentication information sent from the client device 20. In the case where the user of the client device 20 is authenticated by the service device 10, the user is enabled to utilize the services provided by the service device 10. In the case where the user is not authenticated by the service device 10, the user is not enabled to utilize the services provided by the service device 10.

In the exemplary embodiment, the client device 20 is an image forming device that provides functions such as an image scanner function, a copy function, an image forming function for forming an image on paper, and a facsimile function. In the exemplary embodiment, plural client devices 20 are connectable to the communication line 2. In order to prevent complication of the drawing, however, only one client device 20 is illustrated in FIG. 1.

The client device 20 is used when the user utilizes the service provided by the service device 10. In the exemplary embodiment, a person determined in advance may utilize the client device 20, and a user ID and a password provided to the person who may utilize the client device 20 are stored in advance in the client device 20. The client device 20 acquires a set of a user ID and a password input by the user. In the case where the acquired set of the user ID and the password has been stored, the users permitted to use the client device 20.

(Configuration of Service Device 10)

Figure 2:
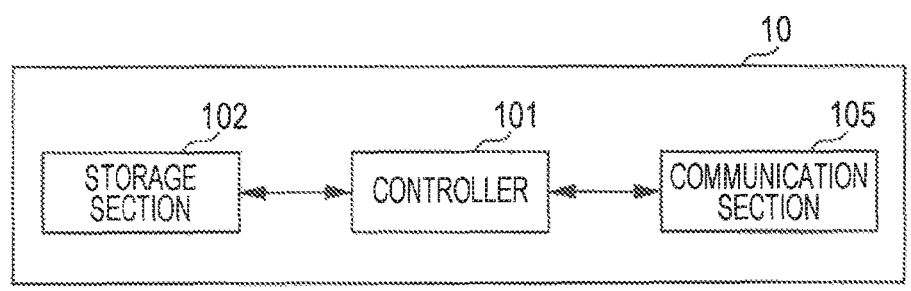
FIG. 2 illustrates an example of the hardware configuration of a service device.

FIG. 2 is a block diagram illustrating an example of the hardware configuration of the service device 10. A communication section 105 functions as a communication interface for data communication, and is connected to the communication line 2.

A storage section 102 includes a device (e.g. a hard disk device) that permanently stores programs executed by a controller 101, a table that store the authentication information, and so forth. The programs stored in the storage section 102 include a program for an operating system, a program for providing the document management service, a program for providing the translation service, and a program for authenticating users of the services provided by the service device 10.

Figures 3, 4:
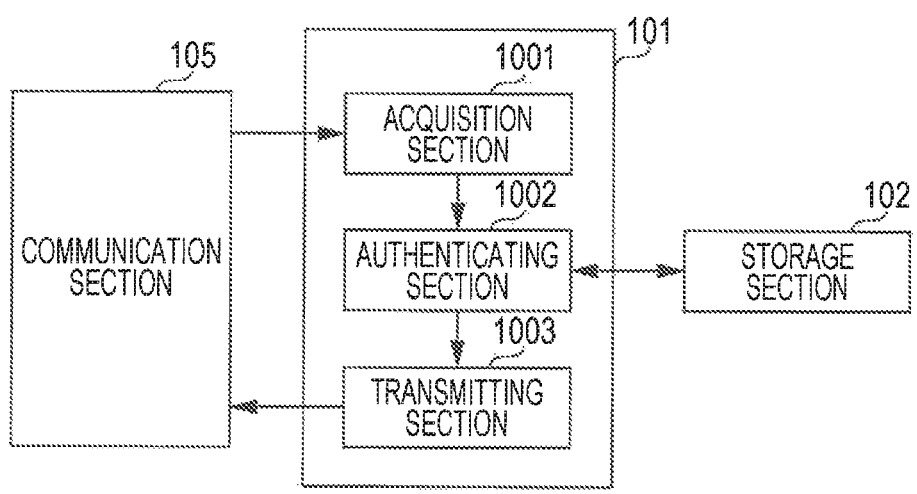
FIG. 3 illustrates an example of a table.
FIG. 4 is a functional block diagram of the service device.

FIG. 3 illustrates an example of a table TB1 that stores the authentication information. The table TB1 has fields for the types of the authentication information. The fields of the authentication information store the authentication information on users permitted to utilize the services provided by the service device 10.

In the exemplary embodiment, the service device 10 supports plural methods for user authentication. For example, the service device 10 supports a method in which an access token is used in accordance with the specifications of OAuth 2.0, and a method in which resource owner password credentials (e.g. a user name and a password) are used in accordance with the specifications of OAuth 2.0. Therefore, the table TB1 is provided with a field for access tokens, in which access tokens issued for the users are stored. The table TB1 is also provided with a field for user names and passwords, in which the user name and the password of the users are stored. The method of authenticating the user is not limited to the two types discussed above. In the present invention, three or more methods may be supported, and three or more fields for the authentication information may be provided in correspondence with the methods.

The controller 101 includes a CPU and a RAM, executes the programs stored in the storage section 102, and controls the storage se 102 and the communication section 105 When the controller 101 executes the programs, functions related to the document management service, functions related to the translation service, and functions for authenticating the user are implemented.

FIG. 4 is a functional block diagram illustrating the configuration of functions related to the present invention, among the functions implemented by the service device 10. An acquisition section 1001 acquires the authentication information transmitted from the client device 20. An authenticating section 1002 authenticates service utilization using the authentication information acquired by the acquisition section 1001. A transmitting section 1003 transmits an authentication result of the authentication performed by the authenticating section 1002 to the client device 20.

(Configuration of Client Device 20)

Figures 5, 6:
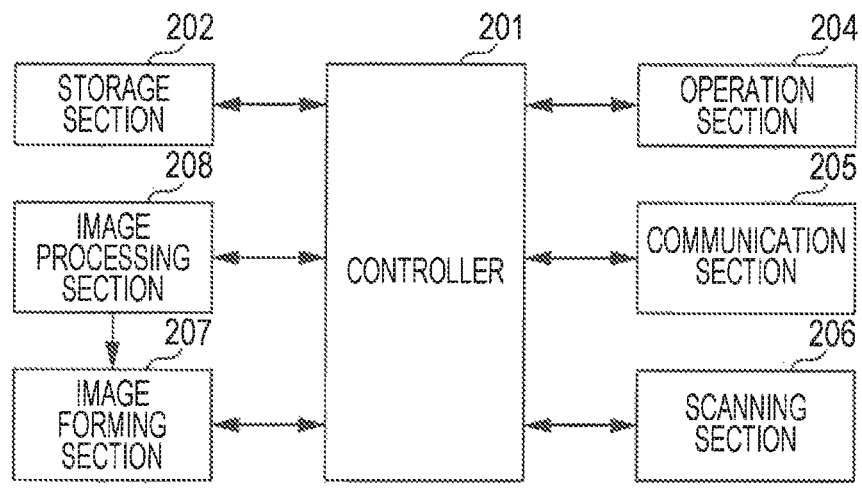
FIG. 5 illustrates an example of the hardware configuration of a client device.
FIG. 6 illustrates an example of a table.

FIG. 5 illustrates an example of the hardware configuration of the client device 20. An operation section 204 includes plural buttons and a touch screen for operating the client device 20. A communication section 205 is connected to the communication line 2, and performs data communication with other devices connected to the communication line 2.

A scanning section 206 includes an image reading device (not illustrated) that optically reads a document and that generates document data that represent the read document. An image processing section 208 performs various processes on image data that represent an image to be formed on paper. The image processing section 208 performs image processing, such as color correction and tone correction, on the image represented by the supplied image data, generates image data for images in respective colors, including yellow (Y), magenta (M), cyan (C), and black (K), from the image which has been subjected to the image processing, and outputs the image data to an image forming section 207.

The image forming section 207 forms a toner image on paper by an electrophotographic system. Specifically, the image forming section 207 includes an image forming section that forms a toner image in yellow color, an image forming section that forms a toner image in magenta color, an image forming section that forms a toner image in cyan color, and an image forming section that forms a toner image in black color. Each of the image forming sections forms an electrostatic latent image on a photoconductor in accordance with the image data output from the image processing section 208, thereafter applies a toner to the surface of the photoconductor to form a toner image in the respective colors including Y, M, C, and K, and transfers the toner image to the paper. After heat and a pressure are applied to the toner image transferred to the paper to fix the toner image, the paper on which the toner image has been formed is ejected to the outside of the client device 20. In the exemplary embodiment, the image forming section 207 forms an image on paper using a toner. However, the image forming section 207 may form an image on paper using an ink by an inkjet system or the like. For a photograph, the image forming section 207 may form an image using an ink ribbon by a thermal transfer system or the like.

A storage section 202, which is an example of the memory according to the present invention, includes a storage device (e.g. a hard disk device) that permanently stores data, and stores document data, an application program (hereinafter referred to as a "document management app") for utilizing the document management service, an application program (hereinafter referred to as a "translation app") for utilizing the translation service, and so forth. In the exemplary embodiment, the document management app and the translation app also perform a process for user authentication for service utilization.

The storage section 202 also stores a table TB2 that stores the authentication information. FIG. 6 illustrates an example of the table TB2. The table TB2 has a field that stores a user ID provided to a person that is permitted to utilize the client device 20 and fields that store the authentication information normally used by the application programs. The fields for the authentication information are provided with a field that stores access tokens normally used by the document management app for authentication and a field that stores user names and passwords normally used by the translation app for authentication. In the table TB2, and for a user A whose user ID is "user A", for example, an access token issued for the user A is stored in the field for the document management app for a record corresponding to "user A", and a user name and a password of the user are stored in the field for the translation app for the record corresponding to "user A".

A controller 201 includes a CPU and a RAM, and executes the programs stored in the storage section 202. When the controller 201 executes the document management app, various functions for utilizing the document management service are implemented. When the controller 201 executes the translation app, various functions for utilizing the translation service are implemented.

Figure 7:
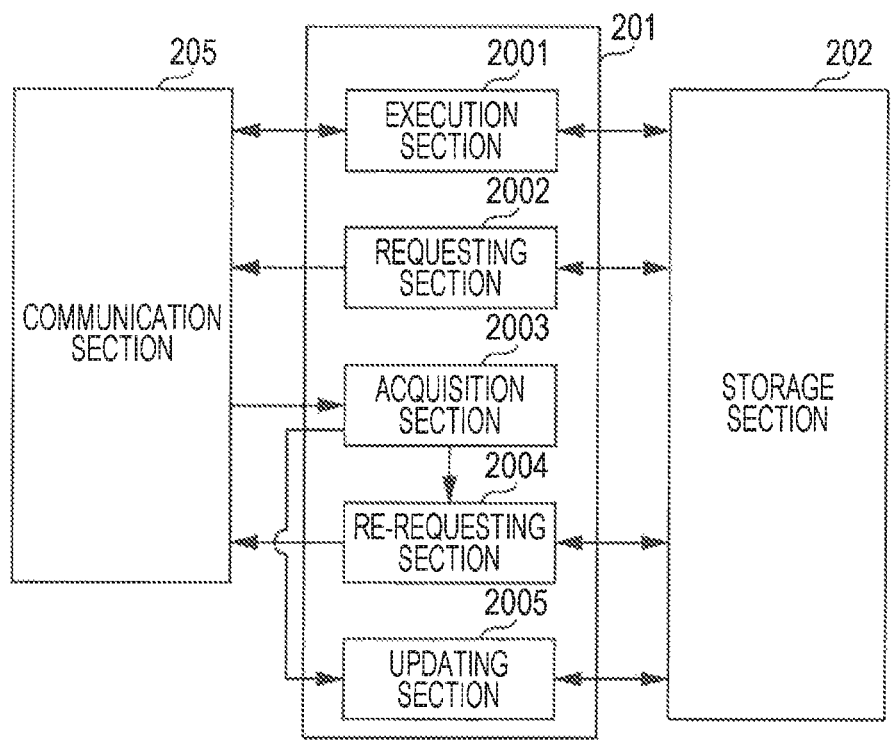
FIG. 7 is a functional block diagram of the client device.

FIG. 7 is a block diagram illustrating the configuration of functions related to the present invention, among the functions implemented by the client device 20.

An execution section 2001 executes the application programs stored in the storage section 202 in response to an instruction from the user. The execution section 2001 is an example of the execution unit according to the present invention.

A requesting section 2002 requests user authentication by acquiring the authentication information on the user from the storage section 202 and transmitting the acquired authentication information to the service device 10.

An acquisition section 2003 acquires the authentication result transmitted from the service device 10 in response to the transmitted authentication information. The acquisition section 2003 is an example of the acquisition unit according to the present invention.

A re-requesting section 2004 re-requests user authentication, in the case where the acquired authentication result indicates a failure in authentication, by acquiring the authentication information on the user correlated with an application that is different from the executed application from the storage section 202 and transmitting the acquired authentication information to the service device 10. The re-requesting section 2004 is an example of the re-requesting unit according to the present invention.

An updating section 2005 updates, in the case where the authentication result indicates a success in authentication, authentication information correlated with an application that is different from the executed application and of the same type as that of the authentication information acquired at the time of the success in authentication. The updating section 2005 is an example f the updating unit according to the present invention.

Example of Operation of Exemplary Embodiment

Next, an example of operation according to the exemplary embodiment will be described. In the following description, an example of operation will be described on the assumption that the authentication information has already been stored in the table TB2 as illustrated in FIG. 6.

When an operation for instructing the client device 20 to display a log-in screen is performed using the operation section 204, the controller 201 controls the touch screen of the operation section 204 so as to display an input screen for a user ID and a password. The user operates the touch screen to input a user ID and a password to the input screen being displayed. In the case where a set of a user ID and a password that is the same as the input set of the user ID and the password is stored in the storage section 202, the controller 201 permits the user to use the client device 20. When the controller 201 permits the user to use the client device 20, the user is enabled to use the document management app and the translation app.

In the case where a document is to be read using the scanning section 206 and document data in the read document are to be stored in the service device 10 which provides the document management service, the user sets the document on the scanning section 206, and performs an operation for an instruction to read the document using the operation section 204. When an operation for an instruction to read the document is performed, the controller 201 controls the scanning section 206 so as to read the document. The scanning section 206 generates document data that represent the read document. The document data generated by the scanning section 206 are stored in the storage section 202. When the scanning section 206 finishes reading the document, the user performs an operation for an instruction to execute the document management app using the operation section 204. The controller 201 (execution section 2001) executes the document management app in response to the performed operation.

Figure 8:
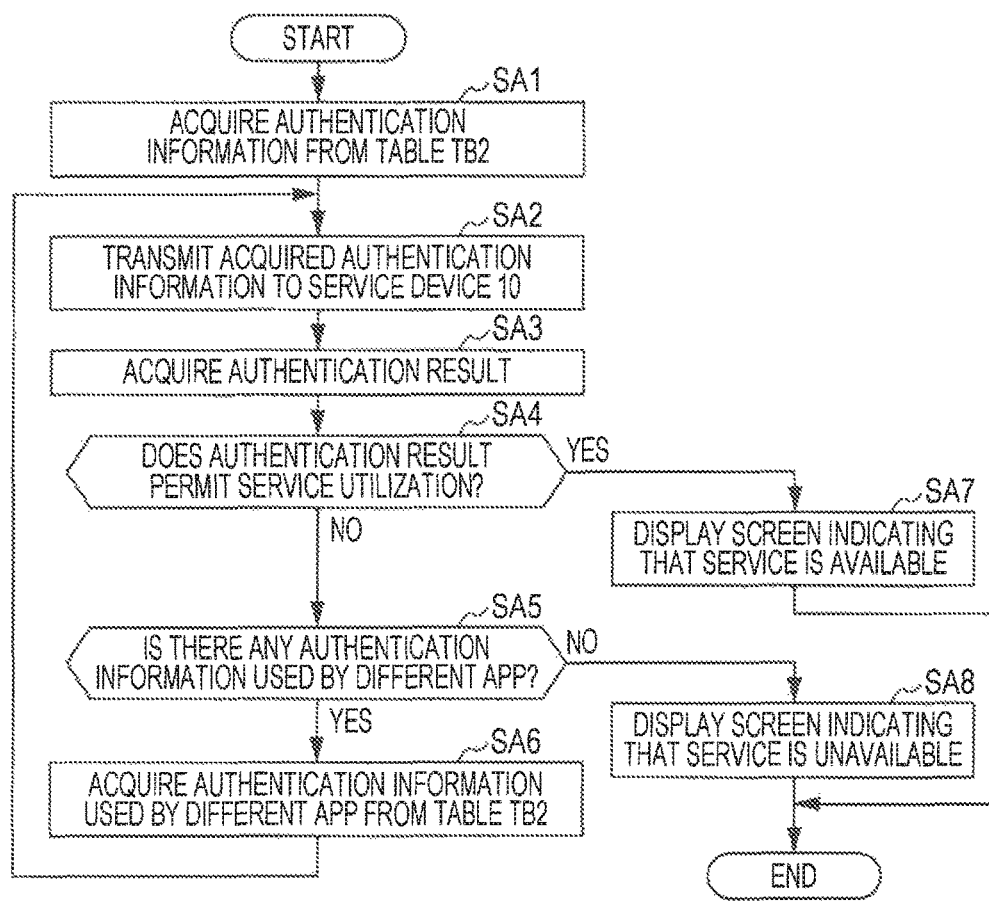
FIG. 8 is a flowchart illustrating the flow of a process performed by a controller.

The controller 201 which has executed the document management app executes a process for authentication to utilize the service provided by the service device 10. FIG. 8 is a flowchart illustrating an example of the flow of the process performed by the controller 201. The controller 201 (requesting section 2002) acquires authentication information for utilizing the service from the table TB2 (step SA1). In the case where the user A whose user ID is "user A" has logged into the client device 20 and the document management app is executed, for example, the controller 201 specifies a record in which "user A" is stored as the user ID from the table TB2, and acquires an access token issued for the user A from the field for the document management app for the specified record. When an access token (authentication information) is acquired, the controller 201 (requesting section 2002) transmits the acquired access token to the service device 10 by controlling the communication section 205 (step SA2).

Figure 9:
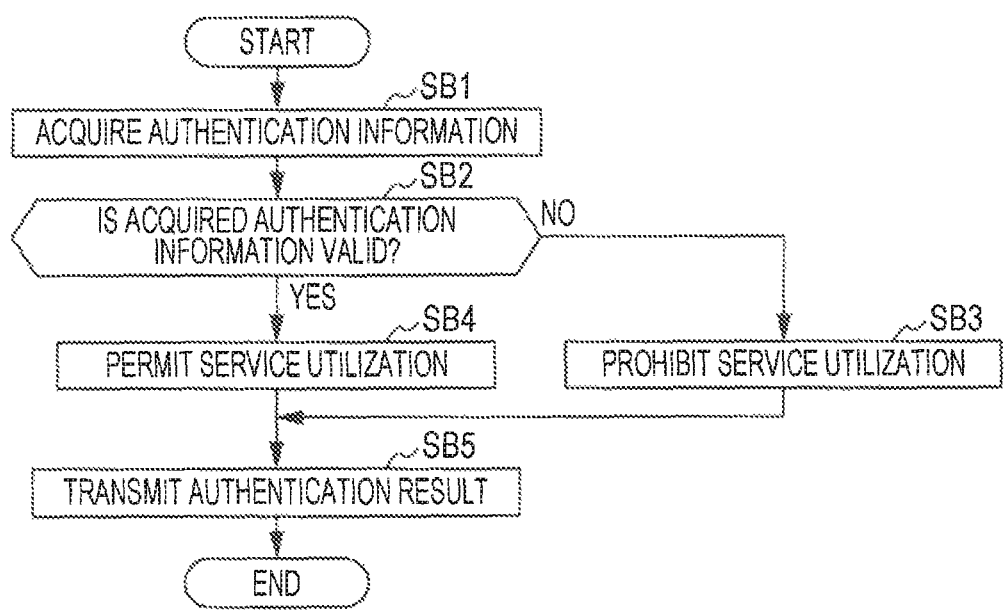
FIG. 9 is a flowchart illustrating the flow of a process performed by a controller.

When the access token transmitted from the client device 20 is acquired by the communication section 105, the controller 101 performs the process of the flowchart illustrated in FIG. 9. The controller 101 (acquisition section 1001) acquires the access token (authentication information) received by the communication section 105 (step SB1). Next, the controller 101 (authenticating section 1002) performs an authentication process for service utilization using the acquired access token. The controller 101 determines whether or not the acquired authentication information is valid (step SB2). Specifically, the controller 101 determines whether or not an access token that is the same as the acquired access token is stored in the table TB1. In the case where an access token that is the same as the acquired access token is not stored in the table TB1, the controller 101 determines that the authentication information is invalid (NO in step SB2), and prohibits service utilization (step SB3). In the case where an access token that is the same as the acquired access en is stored in the table TB1, meanwhile, the controller 101 checks the expiry time of the access token. Also in the case where the expiry time of the access token has been passed, the controller 101 determines that the authentication information is invalid (NO in step SB2), and prohibits service utilization (step SB3).

In the case where an access token that is the same as the acquired access token is stared in the table TB1 and the expiry time of the access token has not been passed, the controller 101 (authenticating section 1002) determines that the authentication information is valid (YES in step SB2), and permits service utilization (step SB4).

When the process in step SB3 or step SB4 is finished, the controller 101 (transmitting Section 1003) transmits the authentication result to the client device 20 (step SB5). When the communication section 205 receives the authentication result, the controller 201 (acquisition section 2003) acquires the authentication result received by the communication section 205 (step SA3). When the authentication result is acquired, the controller 201 (re-requesting section 2004) determines whether or not the acquired authentication result permits service utilization (step SA4).

In the case where the authentication result prohibits service utilization (indicates a failure in authentication) (NO in step SA4), the controller 201 (re-requesting section 2004) determines whether or not there is any authentication information used by an app that is different from the document management app, among the authentication information stored in the table TB2 in correlation with the user ID (step SA5). In the case where there is any authentication information used by a different app (YES in step SA5), the controller 201 acquires the authentication information used by a different app (step SA6). In the case of the table TB2 illustrated in FIG. 6, for example, when authentication using an access token A1 fails, the controller 201 acquires a user name and a password of the user A, which are stored in correlation with the user ID "user A" and used by tie translation app not being executed, as the authentication information. When the user name and the password are acquired as the authentication information, the process flow returns to step SA2, and the controller 201 transmits the acquired user name and password to the service device 10 by controlling the controller 205 (step SA2).

When the communication section 105 receives the user name and the password transmitted from the client device 20, the controller 101 acquires the user name and the password (authentication information) received by the communication section 105 (step SB1). Next, the controller 101 performs an authentication process for service utilization using the acquired user name and password. The controller 101 determines whether or not the acquired authentication information is valid (step SB2). Specifically, the controller 101 determines whether or not a set of a user name and a password that is the same as the acquired set of the user ID and the password is stored in the table TB1. In the case where a set of a user name and a password that is the same as the acquired set of the user name and the password is not stored in the table TB1, the controller 101 determines that the authentication information is invalid (NO in step SB2), and prohibits service utilization (step SB3). In the case where a set of a user name and a password that is the same as the acquired set of the user name and the password is stored in the table TB1, the controller 101 determines that the authentication information is valid (YES in step SB2), and permits service utilization (step SB4).

When the process in step SB3 or step SB4 is finished, the controller 101 transmits the authentication result to the client device 20 (step SB5). When the communication section 205 receives the authentication result, the controller 201 acquires the authentication result received the communication section 205 (step SA3). When the authentication result is acquired, the controller 201 determines whether or not the acquired authentication result permits service utilization (step SA4).

In the case where the authentication result permits service utilization (indicates a success in authentication (YES in step SA4), the controller 201 controls the touch screen so as to display a screen that indicates that the document management service is available (step SA7). The user who sees this screen performs an operation to transmit the document data to the service device 10 using the touch screen. The controller 201 transmits the document data to the service device 10 in response to the performed operation. When the document data transmitted from the client device 20 are acquired by the communication section 105, the controller 101 stores the document data acquired by the communication section 105 in the storage section 102.

In the case where the authentication result prohibits service utilization (indicates a failure in authentication) (NO in step SA4), the controller 201 determines whether or not there is any authentication information used by an app that is different from the document management app, among the authentication information stored in the table TB2 in correlation with the user ID (step SA5). The controller 201 determines there is no authentication information used by a different app (NO in step SA5) since there is no app other than the document management app or the translation app, and controls the touch screen so as to display a screen that indicates that the service is unavailable (step SA8).

[Modifications]

While an exemplary embodiment of the present invention has been described above, the present invention is not limited to the exemplary embodiment discussed above, and may be implemented in a variety of other forms. For example, the exemplary embodiment discussed above may be modified as described below to implement the present invention. The exemplary embodiment discussed above and the modifications described below may be combined with each other.

In the present invention, for example, in the case where re is an application program (hereinafter referred to as a "distribution app") that uses a user name and a password as authentication information and that distributes document data and no authentication information is stored in the table TB2 in correlation with the distribution app, and when service utilization is permitted for the translation app through authentication using a user name and a password, the controller 201 (updating section 2005) may update the authentication information by storing the user name and the password used by the translation app in the field for the distribution app in the table TB2.

In this modification, the user may be allowed to select whether or not to store, as authentication information normally used by the app, authentication information used by a different app in the table TB2. Alternatively, it may be possible to select, in accordance with a condition determined in advance, whether or not to store, as authentication information normally used by the app, authentication information used by a different app in the table TB2. For example, authentication information used by a different app may be stored in the table TB2 as authentication information normally used by the app in the case where the authentication information includes a user name and a password, and authentication information used by a different app may not be stored in the table TB2 as authentication information normally used by the app in the case where the authentication information includes an access token.

In the present invention, the controller 201 performs a process for authentication using authentication information normally used by a different app in the case where service utilization is not permitted. In the case where the type of authentication information normally used by a different app is the same as the type of authentication information used when service utilization is not permitted, however, the controller 201 ray not use the same type of authentication information.

For example, a case where an app X normally uses an access token for a process for authentication, an app Y also normally uses an access token for a process for authentication, and an app Z uses a user name and a password for a process for authentication is assumed. In the case where the controller 201 which has executed the app X is not permitted to utilize the service through a process for authentication in which an access token is used, the access token which is normally used by the app Y for a process for authentication is not acquired from the table TB2, but the user name and the password which are normally used by the app Z for a process for authentication are acquired from the table TB2, in step SA6.

In the present invention, the controller 201 performs a process for authentication using authentication information normally used by a different app in the case where service utilization is not permitted. In the case where the value of authentication information normally used by a different app is the same as the value of authentication information used when service utilization is not permitted, however, the controller 201 may not use authentication information with the same value.

For example, authentication information corresponding to a first app and a second app is assumed as a user ID and a password. The user ID and the password are examples of the value of the authentication information according to the present invention. In the case where the authentication information corresponding to the first app and the authentication information corresponding to the second app have the same user ID and different passwords, i.e. different values, and when authentication using the authentication information corresponding to the first app fails, the controller 201 attempts authentication using the authentication information corresponding to the second app, i.e. authentication information with a different value. In the case where the authentication information corresponding to the first app and the authentication information corresponding to the second app have the same user ID and the same password, i.e. the same value, and when authentication using the authentication information corresponding to the first app fails, the controller 201 does not use the authentication information corresponding to the second app.

In the exemplary embodiment discussed above, the client device 20 is an image forming device. However, the client device 20 is not limited to an image forming device. The client device 20 may be a computer device such as a personal computer, a tablet terminal, a smartphone, a home electric appliance, or a gaming device as long as an application program uses authentication information to be authenticated for service utilization by an external device.

The program according to the present invention may be provided as stored in a computer readable storage medium, such as a magnetic storage medium (such as a magnetic tape and a magnetic disk (such as a hard disk drive (HDD) and a flexible disk (FD))), an optical storage medium (such as an optical disk), a magneto-optical storage medium, and a semiconductor memory, to be installed. Alternatively, the program may be downloaded via a communication line to be installed.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a memory that stores authentication information on a user that utilizes a service provided by a service device in correlation with each application for utilizing the service; and
    a processor configured to act as:
        an execution unit that executes the application in response to an instruction from the user;
        a requesting unit that requests authentication for the user by acquiring the authentication information on the user correlated with the executed application from the memory and transmitting the acquired authentication information to the service device;
        an acquisition unit that acquires an authentication result transmitted in response to the authentication information; and
        a re-requesting unit that is configured to re-request authentication for the user, by an authentication method that is different from an authentication method used by the requesting unit, by acquiring authentication information on the user correlated with an application that is different from the application executed by the execution unit from the memory and transmitting the acquired authentication information to the service device, the re-requesting unit acquiring the authentication information when the authentication result indicates a failure in authentication,
    wherein the executed application is a database application and the application that is different from the executed application is a translation application.

2. The information processing apparatus according to claim 1, wherein the processor is further configured to act as:
    an updating unit that updates, in a case where the authentication result indicates a success in authentication, authentication information for the user correlated with an application that is different from the application executed by the execution unit and of a type that is identical to a type of the authentication information acquired at a time of the success in authentication.

3. The information processing apparatus according to claim 2,
    wherein the updating unit updates the authentication information in response to an operation by the user.

4. The information processing apparatus according to claim 2,
    wherein the updating unit updates the authentication information corresponding to a condition determined in advance.

5. The information processing apparatus according to claim 1,
    wherein the re-requesting unit does not transmit the authentication information on the user correlated with an application that is different from the application executed by the execution unit and with a value that is identical to that of the authentication information acquired at a time of the failure in authentication.

6. The information processing apparatus according to claim 1, wherein the authentication information on the user correlated with the executed application if first authentication information, and the authentication information on the user correlated with an application that is different from the application executed by the execution unit from the memory is second authentication information, and the first authentication information is a different type of authentication information from the second authentication information.

7. The information processing apparatus according to claim 6, wherein the first authentication information utilizes token information and the second authentication information utilizes password information.

8. The information processing apparatus according to claim 1, wherein the authentication request includes checking an expiry time of the authentication information, and if an access time is exceeded, the authentication result indicates the failure.

9. An information processing system comprising:
    an information processing apparatus including
        a service device that acquires authentication information, authenticates a user using the acquired authentication information, and transmits an authentication result;
        a memory that stores the authentication information on the user who utilizes a service provided by the service device in correlation with each application for utilizing the service; and a processor configured to act as:
- an execution unit that executes the application in response to an instruction from the user;
- a requesting unit that requests authentication for the user by acquiring the authentication information on the user correlated with the executed application from the memory and transmitting the acquired authentication information to the service device;
- an acquisition unit that acquires the authentication result transmitted in response to the authentication information; and
- a re-requesting unit that is configured to re-request authentication for the user, by an authentication method that is different from an authentication method used by the requesting unit, by acquiring authentication information on the user correlated with an application that is different from the application executed by the execution unit from the memory and transmitting the acquired authentication information to the service device, the re-requesting unit acquiring the authentication information when the authentication result indicates a failure in authentication, wherein the executed application is a database application and the application that is different from the executed application is a translation application.

10. An information processing method comprising:
- storing authentication information on a user that utilizes a service provided by a service device in correlation with each application for utilizing the service;
- executing the application in response to an instruction from the user;
- requesting authentication for the user by acquiring the authentication information on the user correlated with the executed application and transmitting the acquired authentication information to the service device;
- acquiring an authentication result transmitted in response to the authentication information; and
- re-requesting authentication for the user, by an authentication method that is different from the requesting authentication for the user by acquiring the authentication information, by acquiring authentication information on the user correlated with an application that is different from the executed application and transmitting the acquired authentication information to the service device, the re-requesting including acquiring the authentication information when the authentication result indicates a failure in authentication, wherein the executed application is a database application and the application that is different from the executed application is a translation application.

11. A non-transitory computer readable medium storing a program causing a computer to function as:
- an execution unit that executes an application in response to an instruction from the user;
- a requesting unit that requests authentication for the user by acquiring authentication information on the user correlated with the executed application from a memory and transmitting the acquired authentication information to a service device, the memory storing the authentication information on the user who utilizes a service provided by the service device for each application for utilizing the service;
- an acquisition unit that acquires an authentication result transmitted in response to the authentication information; and
- a re-requesting unit that is configured to re-request authentication for the user, by an authentication method that is different from an authentication method used by the requesting unit, by acquiring authentication information on the user correlated with an application that is different from the application executed by the execution unit from the memory and transmitting the acquired authentication information to the service device, the re-requesting unit acquiring the authentication information when the authentication result indicates a failure in authentication, wherein the executed application is a database application and the application that is different from the executed application is a translation application.

* * * * *